United States Patent
Steiness

(10) Patent No.: US 12,440,535 B2
(45) Date of Patent: Oct. 14, 2025

(54) IL-4 DERIVED PEPTIDE FRAGMENTS FOR USE IN THE TREATMENT OF DIABETIC NEPHROPATHY

(71) Applicant: SERODUS APS, Copenhagen N (DK)

(72) Inventor: Eva Steiness, Hellerup (DK)

(73) Assignee: SERODUS APS, Copenhagen N (DK)

( * ) Notice: Subject to any disclaimer, the term of this patent is extended or adjusted under 35 U.S.C. 154(b) by 0 days.

(21) Appl. No.: 18/724,136

(22) PCT Filed: Apr. 28, 2023

(86) PCT No.: PCT/EP2023/061314
§ 371 (c)(1),
(2) Date: Jun. 25, 2024

(87) PCT Pub. No.: WO2023/209186
PCT Pub. Date: Nov. 2, 2023

(65) Prior Publication Data
US 2025/0064887 A1    Feb. 27, 2025

(30) Foreign Application Priority Data
Apr. 29, 2022  (EP) .................................... 22170903

(51) Int. Cl.
*A61K 38/10* (2006.01)
*A61P 13/12* (2006.01)

(52) U.S. Cl.
CPC .............. *A61K 38/10* (2013.01); *A61P 13/12* (2018.01)

(58) Field of Classification Search
None
See application file for complete search history.

(56) References Cited

U.S. PATENT DOCUMENTS

2011/0300148 A1   12/2011   Bock et al.

FOREIGN PATENT DOCUMENTS

EP      2365983 B1 * 12/2016 ................ A61P 1/00
WO    2010054667       5/2010

OTHER PUBLICATIONS

Chen et al. (Advanced Drug Delivery Reviews 65 (2013) 1357-1369) (Year: 2013).*
Anonymous: "SER130—Serodus", Apr. 19, 2021 (Apr. 19, 2021), XP055882127, Retrieved from the Internet <URL: http://web.archive.org/web/20210419181141/https://serodus.com/ser130/> [retrieved on Jan. 21, 2022].
Serodus: "Annual Report 2020 Next SER150 Clinical Study Has Been Prepared for Regulatory Approval in Australia Table of contents", Jan. 1, 2020 (Jan. 1, 2020), XP055882036, Retrieved from the Internet <URL:https://serodus.com/annual-reports/#> [retrieved on Jan. 20, 2022] *6.
Klementiev Boris et al, "Antiinflammatory properties of a peptide derived from interleukin-4", US, vol. 64, No. 1, doi:10.1016/j.cyto.2013.07.016. ISSN 1043-4666, (Oct. 1, 2013), pp. 112-121, Cytokine, URL: https://www.sciencedirect.com/science/article/pii/S1043466613006315/pdfft?md5=8d8b5685f12b91b18cc362d9f3339942&pid=1-s2.0-S1043466613006315-main.pdf, XP055927157 [ID] 1-8 * p. 115 * DOI: http://dx.doi.org/10.1016/j.cyto.2013.07.016.
Adv Drug Deliv Rev., (Oct. 15, 2013), vol. 65, No. 10, pp. 1357-1369.
James P. Tam: "Synthetic peptide vaccine design: Synthesis and properties of a high-density multiple antigenic peptide system", Proc. Natl. Acad. Sci. USA, vol. 85, Aug. 1988 (Aug. 1, 1988), pp. 5409-5413, XP055170719.
Frederikke E Sembachmette V Ostergaardniels Vrangbo Feldt-Rasmussenkeld Fosgeraujacob Jelsinglisbeth N Fink: "Rodent models of diabetic kidney disease: human translatability and preclinical validity", Review Drug Discov Today, vol. 26, No. 1, Jan. 2021 (Jan. 1, 2021), pp. 200-217, XP086467714, DOI: 10.1016/j.drudis.2020.05.004.

* cited by examiner

*Primary Examiner* — Sergio Coffa
(74) *Attorney, Agent, or Firm* — DUANE MORRIS LLP; Gregory M. Lefkowitz; Brandon A. Chan

(57) ABSTRACT

The present disclosure relates to peptide fragments derived from interleukin-4 (IL-4) for the treatment of diabetic nephropathy.

1 Claim, 4 Drawing Sheets

Specification includes a Sequence Listing.

IL-4 DERIVED PEPTIDE FRAGMENTS FOR USE IN THE TREATMENT OF DIABETIC NEPHROPATHY

CROSS-REFERENCE TO RELATED APPLICATIONS

This application is a § 371 national stage entry of International Application No. PCT/EP2023/061314, filed on Apr. 28, 2023, which claims priority to European Patent Application No. 22170903.3, filed on Apr. 29, 2022, the entire contents of which are incorporated herein by reference.

SEQUENCE LISTING

The instant application contains a Sequence Listing which has been submitted electronically in a computer readable Sequence Listing XML format and is hereby incorporated by reference in its entirety. Said computer readable Sequence Listing in XML format was created on Jun. 21, 2024, is named F9057-38501-SEQ-LISTING.xml and is 12,000 bytes in size.

TECHNICAL FIELD

The present disclosure relates to peptide fragments derived from IL-4 for use in the treatment of diabetic nephropathy. In particular, the present disclosure relates to peptides comprising one or more fragment(s) of IL-4 having the amino acid sequence of SEQ ID NO:1 or a variant thereof for use in the treatment of diabetic nephropathy.

BACKGROUND

Diabetic nephropathy has historically not been considered as a low-grade inflammation (i.e. innate inflammatory disease) as metabolic and haemodynamic factors have been thought to be the main causes of renal injuries. However, recent studies support a role for the innate immune system in both the development and progression of diabetic nephropathy. The progressive non-infectious inflammation involves glomerular and tubular cells resulting in a gradual loss of kidney function. The blood glucose and blood pressure should be kept as normal as possible to delay a loss of kidney function. However, no specific treatment of the innate inflammation has been developed, and the declining glomerular filtration and tubular function do not stop even with adequate control of blood glucose and blood pressure. At the end stage renal failure, the treatment will be chronic dialysis and, in some cases, kidney transplantation. Hence, interventions that prevent or halt the predestined inflammatory induced decline in all functions of nephrons are needed.

Patients are diagnosed with diabetic nephropathy by measuring the biomarker albumin in urine. Urine albumin is often measured in spot urine samples and corrected for creatinine in the same urine sample (ACR mg/g). The ACR is divided into three groups; normo-albuminuria (ACR<30 mg/g), micro-albuminuria (ACR>30 mg/g and <300 mg/g) and macro-albuminuria (ACR>300 mg/g). There is clinical evidence that shows that the higher the ACR, the more advanced the kidney damage.

Urine albumin and Kidney Injury Molecule-1 (KIM-1) are both strong biomarkers of kidney innate inflammation, and human renal biopsies have confirmed the presence of inflammatory cells in both glomeruli, the tubuli, and the interstitium at all stages of diabetic nephropathy.

Human interleukin-4 (IL-4) is an anti-inflammatory cytokine with the amino acid sequence (including signal peptide i.e. amino acid $AA_{1-24}$): MGLTSQLLPP LFFLLACAGN FVHGHKCDIT LQEIIKTLNS LTEQKTLCTE LTVTDI-FAAS KNTTEKETFC RAATVLRQFY SHHEKDTRCL GATAQQFHRH KQLIRFLKRL DRNLWGLAGL NSCPVKEANQ STLENFLERL KTIMREKYSK CSS (UniProtKB-P05112; SEQ ID NO:3).

Mature IL-4 has 129 amino acid residues and contains three intramolecular disulfide bonds (Cys3-Cys127; Cys46-Cys99; Cys24-Cys65) with the amino acid sequence:

(SEQ ID NO: 4)
HKCDITLQEI IKTLNSLTEQ KTLCTELTVT

DIFAASKNTT EKETFCRAAT VLRQFYSHHE

KDTRCLGATA QQFHRHKQLI RFLKRLDRNL

WGLAGLNSCP VKEANQSTLE NFLERLKTIM

REKYSKCSS.

Like other cytokines, IL-4 exerts its biological activity by binding to receptors on the cell surface. Two receptor types for IL-4 are known and denoted type I IL-4R and type II IL-4R. The type I IL-4R is composed of two components; the IL-4Rα chain and the IL-2Rγ ($γ_c$) chain, whereas the type II IL-4R is composed of IL-4Rα and the IL-13α1 chain. IL-4 has many biological roles, including the stimulation of activated B cell and T cell proliferation, and the differentiation of B cells into plasma cells. The presence of IL-4 in extravascular tissues promotes alternative activation of macrophages into M2 cells and inhibits classical activation of macrophages into M1 cells resulting in a diminution of pathological inflammation. IL-4 is mainly secreted by CD4+ T-cells (Th2 cells) which control the concert of specific cytokine inhibitors and soluble cytokine receptors to regulate the human immune response and serve a critical role in the pathogenesis of acute and chronic inflammation by maintaining a proper balance between pro- and anti-inflammatory activities. Thus, modulation of IL-4 signaling has been heavily investigated in autoimmune and inflammatory diseases.

Small peptide fragments derived from IL-4, acting as IL-4 mimetics, have previously shown to inhibit TNF-α release from macrophages and to induce a neuritogenic response from primary neurons (see WO2010/054667). One such example is the peptide having the amino acid sequence AQFHRHKQLIRFLKRA (SEQ ID NO:1). This peptide is capable of binding to the IL-4 receptors and inhibiting macrophage activation, thereby preventing the onset of inflammatory responses, and has therefore been proposed to be useful in a number of inflammatory and autoimmune diseases, such as rheumatoid arthritis, Multiple sclerosis, Alzheimer's disease, Parkinson's disease, and Huntington's disease.

SUMMARY

The present invention relates to the finding that ReninAAV UNx db/db mice administered a compound comprising a peptide fragment of SEQ ID NO:1 (i.e. the treatment group) are able to significantly reduce urinary albumin corrected for creatinine (ACR) and to reduce kidney-injuring molecule corrected for creatinine (KIM-1/CR) (see FIGS. 2 and 3). Urine albumin and KIM-1 are both biomarkers of kidney innate inflammation as seen in various diseases which involve the kidneys, including diabetic nephropathy.

Thus, small peptide fragments derived from IL-4 and acting as IL-4 mimetics may hold promising potential as a new generation of drugs for the treatment of diabetic nephropathy, as the peptide of SEQ ID NO:1 has been shown to be a high affinity partial agonist on type I IL-4R and an antagonist on type II IL-4R (Klementiv 2013). The invention is set forth in the claims.

Definitions and Abbreviations

ACR: Albumin corrected for creatinine
IL-4: Interleukin-4
KIM-1: Kidney Injury Molecule-1
KIM-1/CR: KIM-1 corrected for creatinine
ReninAAV UNx mice: Renin AAV uninephrectomized db/db mice "Diabetic nephropathy" is a type of progressive kidney disease that may occur in individuals with diabetes mellitus. It affects individuals with type 1 and type 2 diabetes. The risk of diabetic nephropathy increases with the duration of diabetes mellitus and other risk factors like high blood pressure and a family history of kidney disease.

The term "individual" refers to vertebrates, particular members of the mammalian species, preferably primates, most preferably humans. As used herein, 'subject' and 'individual' may be used interchangeably.

An "individual in need thereof" refers to an individual who may benefit from the present disclosure. In one embodiment, the individual in need thereof is a diseased individual, in particular an individual with diabetic nephropathy and/or with diabetes mellitus, type 1 or type 2.

The amino acids disclosed herein are natural amino acids (L-amino acids) unless otherwise stated.

An "effective amount" of a peptide can be administered in one administration, or through multiple administrations of an amount that totals an effective amount, for instance within a 24-hour period. It can be determined using standard clinical procedures for determining appropriate amounts and timing of administration. It is understood that the "effective amount" can be the result of empirical and/or individualized (case-by-case) determination on the part of the treating health care professional and/or individual.

In the present context when the disclosure refers to a peptide fragment, wherein a number of contiguous amino acid residues are derived from the amino acid region, e.g., $AA_{68}$-$AA_{97}$ of interleukin-4 (SEQ ID NO:4), it should be understood as a small stretch of amino acids (i.e. a contiguous sequence) selected from the respective region of interleukin-4 (SEQ ID NO:4). As a non-limiting example, e.g., a peptide fragment comprising 16 contiguous amino acid residues derived from the amino acid region $AA_{68}$-$AA_{89}$ of interleukin-4 (SEQ ID NO:4) can be obtained from the contiguous sequence highlighted in bold below.

```
                                        (SEQ ID NO: 4)
HKCDITLQEI IKTLNSLTEQ KTLCTELTVT

DIFAASKNTT EKETFCRAAT VLRQFYSHHE

KDTRCLGATA QQFHRHKQLI RFLKRLDRNL

WGLAGLNSCP VKEANQSTLE NFLERLKTIM

REKYSKCSS.
```

Thus, 16 contiguous amino acid residues derived from the amino acid region $AA_{68}$-$AA_{89}$ of interleukin-4 (SEQ ID NO:4) include the fragments/sequences ATAQQFHRHKQ-LIRFL (SEQ ID NO: 5); TAQQFHRHKQLIRFLK (SEQ ID NO:6); AQQFHRHKQLIRFLKR (SEQ ID NO: 7), QQFHRHKQLIRFLKRL (SEQ ID NO:8), QFHRHKQ-LIRFLKRLD (SEQ ID NO:9), FHRHKQLIRFLKRLDR (SEQ ID NO:10), HRHKQLIRFLKRLDRN (SEQ ID NO:11), and RHKQLIRFLKRLDRNL (SEQ ID NO:12). The peptides may be a variant of the fragments/sequences derived from interleukin-4 (SEQ ID NO:4). As a non-limiting example, AQFHRHKQLIRFLKRA (SEQ ID NO:1) is a variant of the fragment/sequence QQFHRHKQ-LIRFLKRL (SEQ ID NO:8), wherein the terminal amino acids Q and L have been substituted with A (i.e. AQFHRHKQLIRFLKRA (SEQ ID NO:1) has two amino acid substitutions). Thus, in the present context when the disclosure refers to a peptide that e.g. comprises a fragment of 13 to 19 contiguous amino acid residues derived from the amino acid region $AA_{68}$-$AA_{97}$ of interleukin-4 (SEQ ID NO:4), it should be understood that the number of contiguous amino acids cannot be below 13 and cannot exceed 19 amino acids in a single amino acid stretch (i.e. in fragment not taking any linker into account if present), but that the peptide may comprise more than one such fragment linked through a linker (spacer). As a non-limiting example, the peptide below of Formula (I) comprises two peptide fragments of each 16 contiguous amino acids that are linked via a linker at their C-terminal.

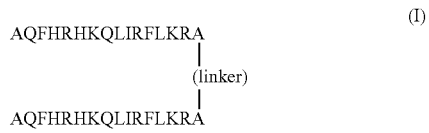

(I)

The peptide fragment(s) may also be lipidated to alter the pharmacokinetic properties of the peptides.

"Sequence identity" as used herein is the number of amino acid residues which match exactly between two different sequences to be compared. If a variant is 90% identical to a sequence having ten amino acid residues, the variant can differ from the sequence by one amino acid substitution.

The terms "treating", "treatment" and "therapy" as used herein refer equally to curative therapy, prophylactic, preventative, or ameliorating therapy. For purposes of this disclosure, beneficial or desired clinical results include, but are not limited to, alleviation of symptoms, diminishment of extent of disease, stabilized (i.e., not worsened) condition, delay or slowing of progression or worsening of condition/symptoms, amelioration or palliation of the condition or symptoms, and remission (whether partial or total), whether detectable or undetectable.

The term "covalently linked" should be understood as at least two peptides/fragments according to the disclosure covalently linked to each other through a linker or spacer. The covalently linked peptides may have the same sequence or different sequences, preferably the same sequence. Various type of linkers (spacers) may be used to link the peptides together, e.g. those commonly known in the art for peptide dendrimers, fusion peptides/proteins, or hybrid peptides. E.g. the linker (spacer) may be a peptide linker, e.g. lysine-beta-alanine as illustrated herein, a single amino acid such as lysine, or a small stretch of amino acids (see e.g. Adv Drug Deliv Rev. 2013 Oct. 15; 65 (10): 1357-1369). The linker may also be a non-peptide linker, e.g. PEG chain or a diamine such as ethylene diamine. The skilled person will appreciate that the linker (spacer) used may be changed to other linkers (spacers) without departing from the inventive concept. Most preferably, the peptides/fragments are covalently linked via their N-terminal or C-terminal, most preferably their C-terminal as illustrated herein. Most preferably, the two peptides/fragments are linked by a lysine as illustrated herein. The beta-alanine of the lysine linker part merely acts as a spacer between the Rink linker used in the SPPS to reduce steric hindrance during synthesis. The beta-alanine part may therefore be substituted with other common spacers used in the art of SPPS. Various branched dendrimers based on lysine may be obtained as e.g. described in (Proc. Natl. Acad. Sci. USA, Vol 85, pp. 5409-5413, August 1988). The dimer disclosed herein was found to perform better than the monomer.

The term "variant" means that the peptide sequence may be modified, for example by substitution of one or more of the amino acid residues. Both L-amino acids and D-amino acids may be used as well as unnatural amino acids, preferably L-amino acids are used. In the present context, when referring to a variant having one, two, or three amino acid substitutions and/or deletions, it should be understood that the sum of the substitutions and/or deletions is maximum three. As an example, a variant may e.g. have two substitutions and one deletion (sum=3). Likewise, a variant may have three substitutions and zero deletions (sum=3), or a variant may have three deletions and zero substitutions (sum=3). As an example, it follows that when the present disclosure relates to a peptide for use in the treatment of diabetic nephropathy, wherein said peptide e.g. has 13 amino acid residues and further wherein said peptide comprises a variant of AQFHRHKQLIRFLKRA (SEQ ID NO:1, i.e. 16 amino acids), it must be a variant having three deletions (16−3=13 amino acids). Preferably, a substitution in a variant is a conservative substitution to a conservative amino acid. The groups of conservative amino acids are as the following:

A, G (neutral, weakly hydrophobic),
Q, N, S, T (hydrophilic, non-charged)
E, D (hydrophilic, acidic)
H, K, R (hydrophilic, basic)
A, L, P, I, V, M, F, Y, W (hydrophobic, aromatic)
C (cross-link forming)

Conservative substitutions may be introduced in any position of the peptide for use according to the present disclosure. It may however also be desirable to introduce non-conservative substitutions in any position of the peptide for use according to the present disclosure.

The peptide sequences of the present disclosure may be prepared by conventional synthetic methods commonly used in the art, such as solid phase peptide synthesis (SPPS) using coupling reagents.

DETAILED DESCRIPTION

The present invention relates to the surprising finding that small peptide fragments derived from IL-4, more particularly the α-helix C of IL-4, are IL-4R type I agonists, and are capable of decreasing ACR and KIM-I in ReninAAV UNx db/db mice.

Mature IL-4 has 129 amino acid residues and contains three intramolecular disulfide bonds (Cys3-Cys127; Cys46-Cys99; Cys24-Cys65). The peptide used in the experimental section herein has the amino acid sequence of AQFHRHKQ-LIRFLKRA (SEQ ID NO: 1) (i.e. a first fragment) covalently linked to another peptide having the amino acid sequence of AQFHRHKQLIRFLKRA (SEQ ID NO: 1) (i.e. a second fragment) through a linker (spacer) (i.e. lysine-beta-alanine). The peptide of SEQ ID NO: 1 is a variant of the peptide fragment derived from the amino acids $AA_{71}$-$AA_{86}$ of SEQ ID NO:4 (IL-4 without signal sequence) (highlighted in bold below).

```
                                        (SEQ ID NO: 4)
HKCDITLQEI IKTLNSLTEQ KTLCTELTVT

DIFAASKNTT EKETFCRAAT VLRQFYSHHE

KDTRCLGATA QQFHRHKQLI RFLKRLDRNL

WGLAGLNSCP VKEANQSTLE NFLERLKTIM

REKYSKCSS.
```

As can be seen from the alignment of SEQ ID NO:1 with the amino acids $AA_{71}$-$AA_{86}$ of SEQ ID NO:4, SEQ ID NO: 1 is a variant of the peptide fragment derived from this region having two amino acid substitutions (highlighted in bold).

```
                                        (SEQ ID NO: 4)
QQFHRHKQLIRFLKRL
AA₇₁-AA₈₆ of IL-4

(SEQ ID NO: 1)
AQFHRHKQLIRFLKRA.
```

Figure 1A:
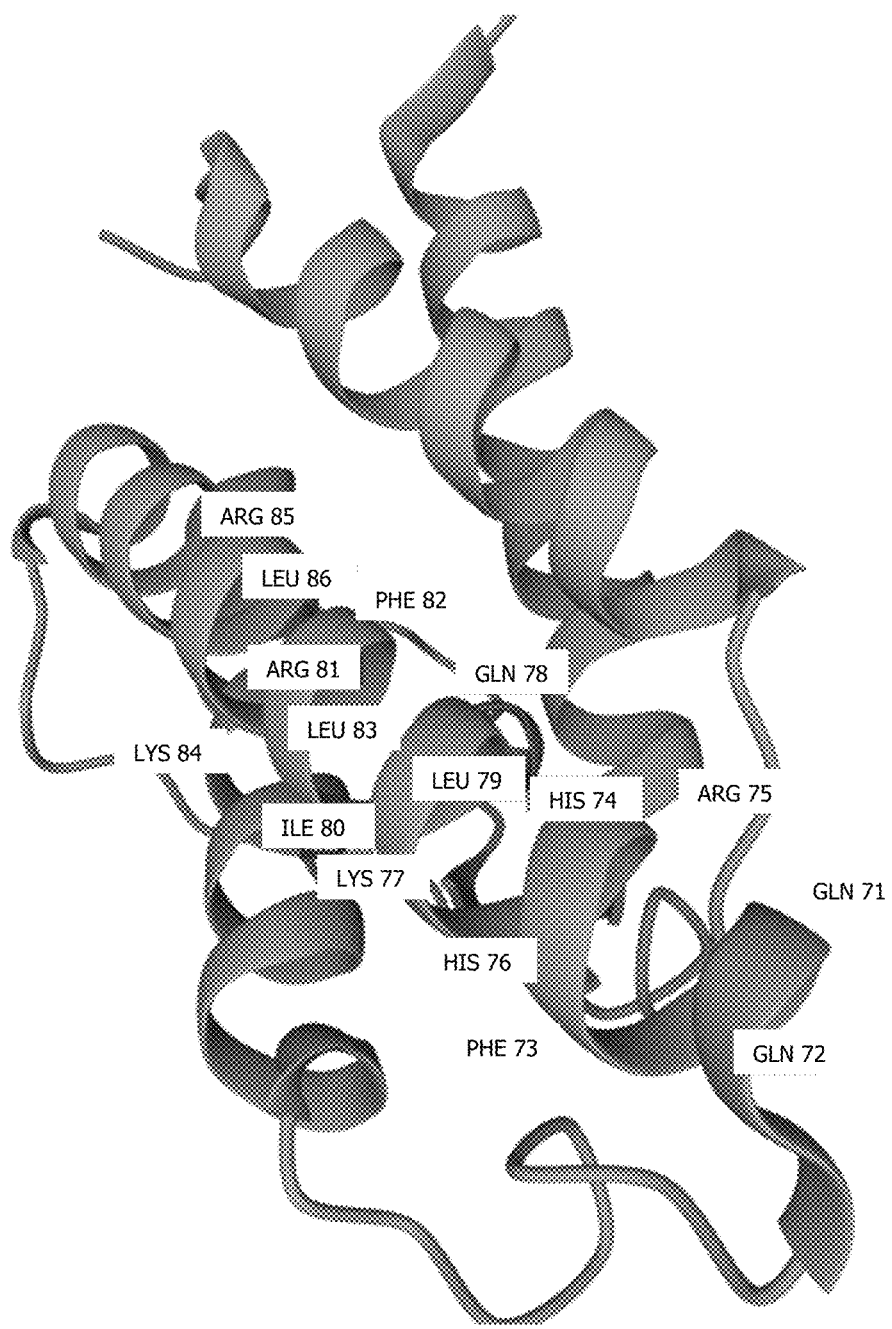
FIGS. 1A and 1B show the crystal structure of IL-4 (PDB identifier: 1CYL) with the amino acid residues indicated for the region $AA_{71}$-$AA_{86}$ which forms part of the α-helix C ($AA_{71}$-$AA_{94}$).

The region $AA_{71}$-$AA_{86}$ of SEQ ID NO:4 forms part of the α-helix C ($AA_{71}$-$AA_{94}$) of IL-4 as shown in the crystal structure in FIG. 1A/B (PDB identifier: 1CYL). This α-helix C interacts with the ectodomain part of IL-4 Rα1 and therefore, peptide fragments derived from the α-helix C ($AA_{71}$-$AA_{94}$) are likely to possess similar binding characteristics and pharmacology as SEQ ID NO:1. In order words, peptide fragments derived from the region at or in close proximity to $AA_{71}$-$AA_{94}$, preferably $AA_{71}$-$AA_{86}$ of SEQ ID NO:4, are suitable for use in the treatment of diabetic nephropathy.

Thus, in in a first aspect, the present disclosure relates to a peptide for use in the treatment of diabetic nephropathy, wherein the peptide comprises a fragment consisting of 13 to 19 contiguous amino acid residues derived from the amino acid region $AA_{68}$-$AA_{97}$ of interleukin-4 (SEQ ID NO:4), preferably $AA_{68}$-$AA_{89}$ of interleukin-4 (SEQ ID NO:4), most preferably $AA_{71}$-$AA_{86}$ of interleukin-4 (SEQ ID NO:4), or is a variant thereof having one, two, three, or four amino acid substitutions. In a preferred embodiment, the peptide comprises a fragment consisting of 14 to 18 contiguous amino acid residues derived from the amino acid region AA$_{68}$-AA$_{97}$ of interleukin-4 (SEQ ID NO:4), preferably AA$_{68}$-AA$_{89}$ of interleukin-4 (SEQ ID NO:4), most preferably AA$_{71}$-AA$_{86}$ of interleukin-4 (SEQ ID NO:4), or is a variant thereof having one, two, three, or four amino acid substitutions. In a more preferred embodiment of the second aspect, the peptide comprises a fragment consisting of 15 to 17 contiguous amino acid residues derived from the amino acid region AA$_{68}$-AA$_{97}$ of interleukin-4 (SEQ ID NO:4), preferably AA$_{68}$-AA$_{89}$ of interleukin-4 (SEQ ID NO:4), most preferably AA$_{71}$-AA$_{86}$ of interleukin-4 (SEQ ID NO:4) or is a variant thereof having one, two, three, or four amino acid substitutions. In an even more preferred embodiment, the peptide comprises a fragment consisting of 16 contiguous amino acid residues derived from the amino acid region AA$_{68}$-AA$_{97}$ of interleukin-4 (SEQ ID NO:4), preferably AA$_{68}$-AA$_{89}$ of interleukin-4 (SEQ ID NO:4), most preferably AA$_{71}$-AA$_{86}$ of interleukin-4 (SEQ ID NO:4) or is a variant thereof having one, two, three, or four amino acid substitutions. In the above embodiments, it is highly preferred that the peptide comprises a fragment of the amino acid sequence AQFHRHKQLIRFLKRA (SEQ ID NO:1), or a variant of AQFHRHKQLIRFLKRA (SEQ ID NO:1) having one or two substitutions. In a preferred embodiment, the present disclosure relates to a peptide for use in the treatment of diabetic nephropathy, wherein the peptide has the structure:

AQFHRHKQLIRFLKRA (SEQ ID NO: 1), or is a variant thereof with 1 or 2 amino acid substitutions.

In a most preferred embodiment, the present disclosure relates to a peptide for use in the treatment of diabetic nephropathy, wherein the peptide consists of two fragments, each connected via their C-terminal by a linker, with the structure:

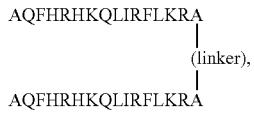

or is a variant thereof with 1 or 2 amino acid substitutions in each fragment.

In any of the above embodiments, the variant preferably has two amino acid substitutions and/or deletions, even more preferably one amino acid substitution or deletion.

The peptides for use according to the disclosure may be amidated at the C-terminal (—CONH$_2$), have a free carboxylic acid (—COOH), or another post-translational modification, such as a methyl ester (—COOMe). The peptides according to the present invention may have a free amine (—NH$_2$), be N-acylated (—NHCOR), N-methylated (—NHCH$_3$ or —N(CH$_3$)$_2$) or deaminated at the N-terminal. The peptides may also be lipidated, e.g. at the N-terminal and/or at one or more lysine residue(s), in order to alter the PK properties of the peptides.

Thus, in an embodiment of the present disclosure, the C-terminal amino acid exists as the free carboxylic acid ("—COOH"). In another embodiment, the C-terminal amino acid is an amidated derivative ("—CONH$_2$"). In another embodiment, the N-terminal amino acid comprises a free amino-group ("NH$_2$"). In another embodiment, the N-terminal amino acid is the acetylated derivative (COCH$_3$). Most preferably, the C-terminal is amidated ("—CONH$_2$"), unless linked via the C-terminal to another peptide/fragment via a linker. Most preferably, the N-terminal comprises a free amino group ("NH$_2$").

In a highly preferred embodiment, the present disclosure relates to a peptide for use in the treatment of diabetic nephropathy, wherein said peptide comprises 16 amino acid residues and further wherein the peptide comprises SEQ ID NO:1 (AQFHRHKQLIRFLKRA). In view of the fact that SEQ ID NO:1 has 16 amino acids, it should be understood from the wording "comprising" that the peptide may be e.g. lipidated and/or contain post-translational modifications commonly used in the art.

In another highly preferred embodiment, the present disclosure relates to a peptide for use in the treatment of diabetic nephropathy, wherein said peptide consists of SEQ ID NO:1 (AQFHRHKQLIRFLKRA) or a variant of SEQ ID NO:1 (AQFHRHKQLIRFLKRA) having one, two, or three amino acid substitutions.

In yet a highly preferred embodiment, the present disclosure relates to a peptide for use in the treatment of diabetic nephropathy, wherein said peptide is a peptide consisting of Ac-AQFHRHKQLIRFLKRA (SEQ ID NO:2).

In a highly preferred embodiment, the present disclosure relates to a peptide for use in the treatment of diabetic nephropathy, wherein said peptide is a peptide consisting of AQFHRHKQLIRFLKRA (SEQ ID NO:1).

The peptides according to the invention are agonists on type I IL-4R and preferably antagonists on type II IL-4R. The agonists may be either super agonists, full agonists, or partial agonists.

The peptides according of the invention may form part of a multimer, such as a dimer, trimer, or tetramer. Multimers, e.g. peptide dendrimers, incorporating the peptides of the present disclosure may also be used. Most preferably, the peptide is in the form of a monomer or dimer, most preferably a dimer. Peptides according to the present disclosure may be covalently linked to form a multimer (e.g. a dimer) by covalently connecting the peptides through various linkers (spacers), such as those commonly used in the art for fusion peptides or proteins. Most preferably, the peptides are linked via the C-terminal or N-terminal, most preferably the C-terminal.

In a second aspect of the invention, the present disclosure relates to a peptide or a pharmaceutically acceptable salt thereof, wherein said peptide comprises two or more covalently linked peptide fragments derived from the α-helix C of IL-4. Most preferably, the peptides are linked via the C-terminal as illustrated herein.

Thus, in a second aspect, the present disclosure relates to a peptide or a pharmaceutically acceptable salt thereof, wherein said peptide comprises two or more covalently linked fragments, wherein each fragment consists of 13 to 19 contiguous amino acid residues derived from the amino acid region AA$_{68}$-AA$_{97}$ of interleukin-4 (SEQ ID NO:4), preferably AA$_{68}$-AA$_{89}$ of interleukin-4 (SEQ ID NO:4), most preferably AA$_{71}$-AA$_{86}$ of interleukin-4 (SEQ ID NO:4) or a variant thereof having one, two, three, or four amino acid substitutions. In a preferred embodiment of the second aspect, each fragment consists of 14 to 18 contiguous amino acid residues derived from the amino acid region AA$_{68}$-AA$_{97}$ of interleukin-4 (SEQ ID NO:4), preferably AA$_{68}$-AA$_{89}$ of interleukin-4 (SEQ ID NO:4), most preferably AA$_{71}$-AA$_{86}$ of interleukin-4 (SEQ ID NO:4) or is a variant thereof having one, two, three, or four amino acid substitutions. In a more preferred embodiment of the second aspect, each fragment consists of 15 to 17 contiguous amino acid residues derived from the amino acid region AA$_{68}$-AA$_{97}$ of interleukin-4 (SEQ ID NO:4), preferably $AA_{68}$-$AA_{89}$ of interleukin-4 (SEQ ID NO:4), most preferably $AA_{71}$-$AA_{86}$ of interleukin-4 (SEQ ID NO: 4) or is a variant thereof having one, two, three, or four amino acid substitutions. In an even more preferred embodiment of the second aspect, each fragment consists of 16 contiguous amino acid residues derived from the amino acid region $AA_{68}$-$AA_{89}$ of interleukin-4 (SEQ ID NO:4), preferably $AA_{68}$-$AA_{89}$ of interleukin-4 (SEQ ID NO: 4), most preferably $AA_{71}$-$AA_{86}$ of interleukin-4 (SEQ ID NO:4) or is a variant thereof having one, two, three or four amino acid substitutions. In the above embodiments of the second aspect, it is highly preferred that each fragment comprises the amino acid sequence AQFHRHKQLIRFLKRA (SEQ ID NO:1), or a variant of AQFHRHKQLIRFLKRA (SEQ ID NO:1) having one or two substitutions. Most preferably, the covalently linked fragments are identical.

In a preferred embodiment of the second aspect, the present disclosure relates to a peptide or a pharmaceutically acceptable salt thereof for use in the treatment of diabetic nephropathy, wherein said peptide comprises two or more covalently linked fragments, wherein each fragment consists of 13 to 19 amino acid residues, and further wherein said fragment comprises the amino acid sequence AQFHRHKQ-LIRFLKRA (SEQ ID NO:1), or a variant of AQFHRHKQ-LIRFLKRA (SEQ ID NO: 1) having one, two, or three amino acid substitutions and/or deletions.

In a more preferred embodiment of the second aspect, the present disclosure relates to a peptide or a pharmaceutically acceptable salt thereof for use in the treatment of diabetic nephropathy, wherein said peptide comprises two or more covalently linked fragments, wherein each fragment consists of 14 to 18 amino acid residues, and further wherein each fragment comprises the amino acid sequence AQFHRHKQ-LIRFLKRA (SEQ ID NO:1), or a variant of AQFHRHKQ-LIRFLKRA (SEQ ID NO: 1) having one, two, or three amino acid substitutions and/or deletions.

In a yet more preferred embodiment of the second aspect, the present disclosure relates to a peptide or a pharmaceutically acceptable salt thereof for use in the treatment of diabetic nephropathy, wherein said peptide comprises two or more covalently linked fragments, wherein each fragment consists of 15 to 17 amino acid residues, and further wherein each fragment comprises the amino acid sequence AQFHRHKQLIRFLKRA (SEQ ID NO:1), or a variant of AQFHRHKQLIRFLKRA (SEQ ID NO: 1) having one, two, or three amino acid substitutions and/or deletions.

In an even more preferred embodiment of the second aspect, the present disclosure relates to a peptide or a pharmaceutically acceptable salt thereof for use in the treatment of diabetic nephropathy, wherein said peptide comprises two or more covalently linked fragments, wherein each fragment consists of 16 amino acid residues, and further wherein the peptide comprises SEQ ID NO:1 (AQFHRHKQLIRFLKRA) or a variant of SEQ ID NO:1 (AQFHRHKQLIRFLKRA) having one, two, or three amino acid substitutions.

In any of the above embodiments of the second aspect, the variant preferably has two amino acid substitutions and/or deletions, even more preferably one amino acid substitution or deletion. In any of the above embodiments of the second aspect, the peptide most preferably comprises two covalently linked fragments (i.e. a dimer), wherein each fragment consists of the same sequence.

In a most preferred embodiment of the second aspect, the present disclosure relates to a peptide or a pharmaceutically acceptable salt thereof for use in the treatment of diabetic nephropathy, wherein said peptide has the structure of Formula:

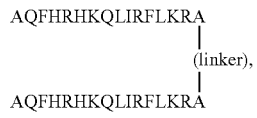

or is variant thereof having one or two amino acid substitutions in each peptide fragment.

Each fragment of SEQ ID NO:1 (i.e. AQFHRHKQ-LIRFLKRA) in the dimeric peptide of formula (I) is covalently connected through a linker at its C-terminal.

In another most preferred embodiment of the second aspect, the present disclosure relates to a peptide or a pharmaceutically acceptable salt thereof for use in the treatment of diabetic nephropathy, wherein said peptide is a dimer of SEQ ID NO:1 connected through a linker (lysine-beta-alanine) as shown in the structure below (compound A):

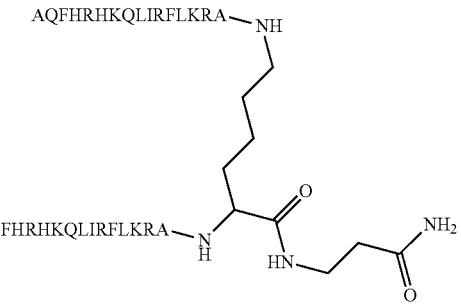

In another embodiment of the second aspect, the present disclosure relates to a peptide for use in the treatment of diabetic nephropathy, wherein said peptide forms part of a tetrameric dendrimer comprising four copies of SEQ ID NO:1 and/or SEQ ID NO: 2, or a variant thereof comprising one, two, or three amino acid substitutions. In another preferred embodiment, the peptide is a dimeric dendrimer comprising two copies of SEQ ID NO: 1, or a variant thereof comprising one, two, or three amino acid substitutions, or two copies of SEQ ID NO:2, or a variant thereof comprising one, two, or three amino acid substitutions. In another embodiment, the peptide is a tetrameric dendrimer comprising four copies of SEQ ID NO:1, or a variant thereof comprising one, two, or three amino acid substitutions, or four copies of SEQ ID NO: 2, or a variant thereof comprising one, two, or three amino acid substitutions.

In a third aspect, the present disclosure relates to a pharmaceutical composition for use in the treatment of diabetic nephropathy, wherein said pharmaceutical composition comprises one or more peptides or a pharmaceutically acceptable salt thereof according to the aspects and embodiments disclosed herein. The pharmaceutical composition may comprise acceptable pharmaceutical carriers and optionally one or more excipients.

The pharmaceutical composition (i.e. formulation) includes but are not limited to tablets, pills, capsules, emulsions, suspensions, sustained release formulations, solutions, or freeze-dried powder intended for dissolution prior to administration. In some embodiments, the formulation may be a depot formulation providing slow release. It should be appreciated that different routes of administration may be used depending on the choice of formulation and chemical and/or metabolic stability of the polypeptides. Such administration routes may include but are not limited to oral administration, parenteral administration (intravenous (IV), subcutaneous (SC), intradermal (ID) and intramuscular (IM)), or inhalation. In a preferred embodiment of the invention, the administration route is parental administration. In an even more preferred embodiment, the administration route is subcutaneous.

In a fourth aspect, the present disclosure relates to a method for treatment of diabetic nephropathy, the method comprising administering an effective amount of a peptide or a pharmaceutically acceptable salt thereof to an individual in need thereof according to any of the aspects and embodiments disclosed herein.

Examples—Effect of an Il-4 Derived Peptide on Markers of Diabetic Nephropathy

Material and Methods

Animals 28 female mice (BKS.Cg-Dock7m+/+Lepradb/db BLKS, 5 weeks of age) were transferred to the Gubra Research animal unit. Throughout the habituation and study period, the animals were housed in a light-, temperature-, and humidity-controlled room with free access to food and water. All animal experiments were conducted in accordance with Gubra's bioethical guidelines, which are fully compliant with internationally accepted principles for the care and use of laboratory animals. The animals were group-housed until uni-nephrectomies, then single-housed.

The animals were terminated on day 77; blood was taken for later analysis, body weight was recorded, and spot urine was collected.

Compounds

Compound A was provided by Phlogo ApS, Copenhagen, Denmark (10 mg/ml miliQ water diluted to the dose formulations). Compound A was provided as a dimeric peptide comprising two copies of the sequence AQFHRHKQ-LIRFLKRA (SEQ ID NO: 1). The synthesis of compound A was performed with a Rink linker coupled to the resin. A beta-alanine was chosen as spacer between the Rink linker and the lysine, on which the dimeric peptide was constructed, in order to lower steric repulsion between the bulky Rink linker and the dimeric peptide. Vehicle was miliQ:PBS 1:5.

In Vivo Procedures

After one week of acclimatization, the mice received an IV injection of Renin adenosine-associated virus (AAV). One week later, all mice were uni-nephrectomized. Two weeks after the Renin AAV IV injection, the mice were randomized according to blood glucose into two groups: a vehicle group (n=14) and a 10 mg/kg Compound A (n=14). The compound as well as the vehicle groups were administered subcutaneously once daily.

Biochemical Analysis

Urine samples were stored at minus 80° C. until analysis. Urine for measurement of albumin and creatinine was centrifuged at 2000 g for 2 min. prior to analysis. Urine albumin was measured using a commercial ELISA kit (Bethyl Laboratories, Inc.), according to the manufacturer's instructions, and urine creatinine was measured using a commercial kit (Roche Diagnostics) on the Cobas c 501 autoanalyzer, according to the manufacturer's instructions. Urinary KIM-1 was measured using a commercial ELISA kit (R&D Systems) according to the manufacturer's instructions.

Results

Figure 1B:
Figure 2:
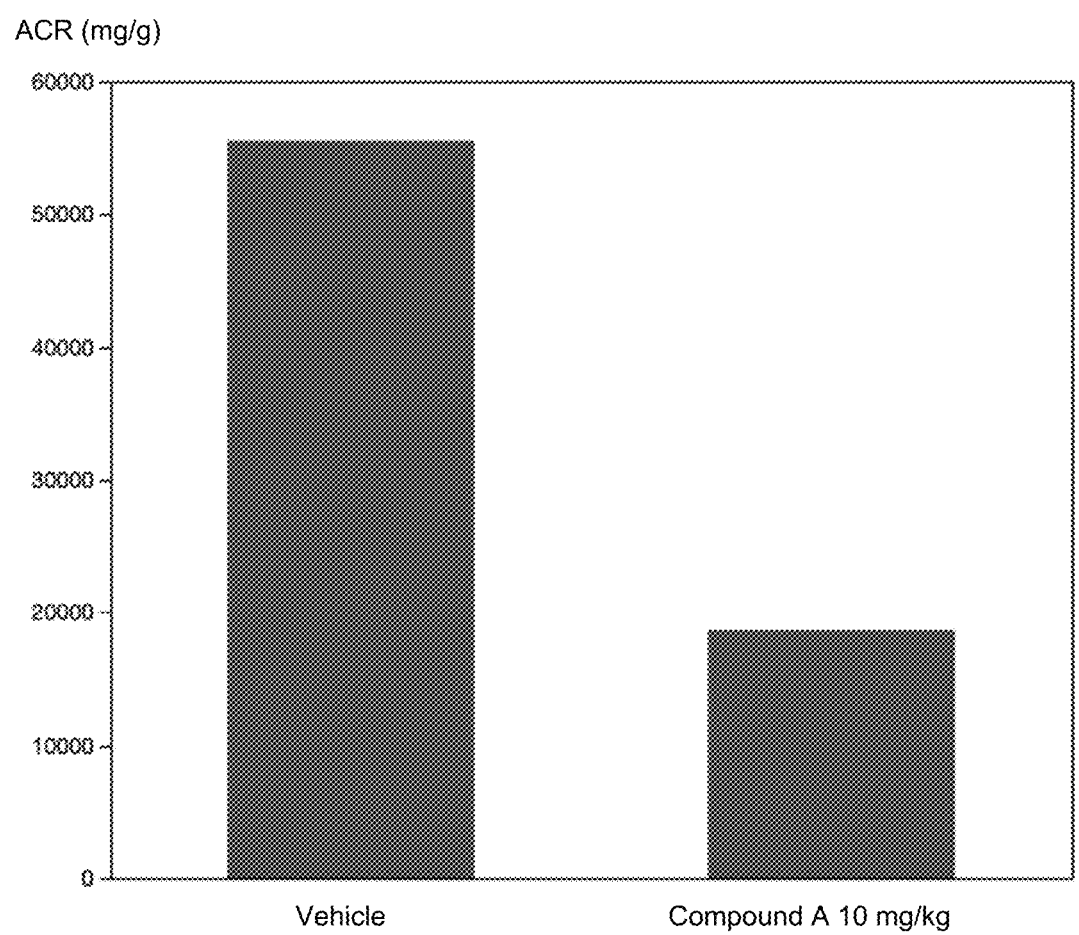
FIG. 2 shows the effect of lowering ACR (mg (g) of Compound A in the treatment versus the vehicle group.
Figure 3:
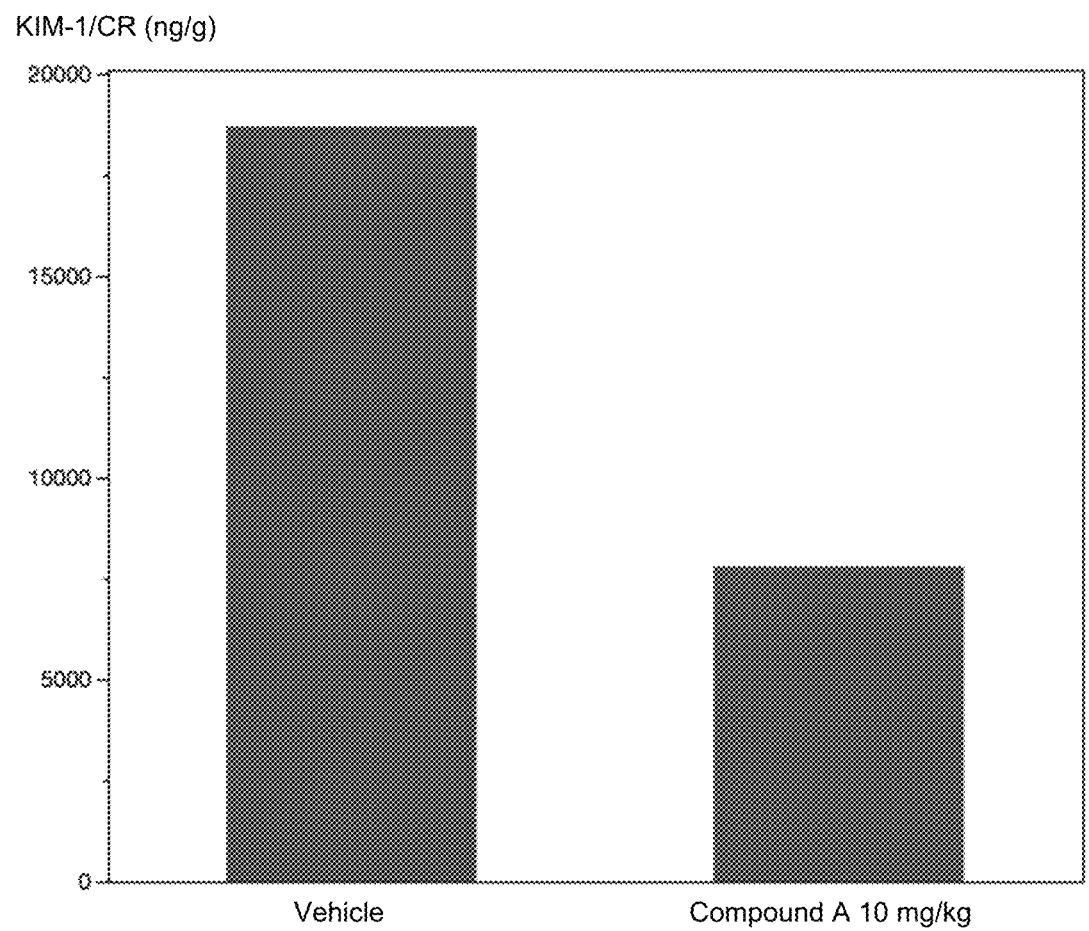
FIG. 3 shows the effect of KIM-1/CR (pg/g) of Compound A in the treatment versus the vehicle group.

Compared to vehicle, the tested Compound A significantly decreased both ACR mg/g (FIG. 1) and KIM-1/CR pg/g (FIG. 2).

DISCUSSION

The ReninAAV UNx db/db mice model is described as one of the best pharmacological models to describe the development of diabetic nephropathy and thereby to elucidate the compound's influence on the progression of the disease (Sembach 2020). Urine albumin and KIM-1 are both strong biomarkers of kidney innate inflammation.

The results demonstrated herein indicate that Compound A mimics IL-4 protein stimulation of the IL-4Ra1 inducing an anti-inflammatory effect. Compound A significantly reduced both urinary albumin, a biomarker from mainly glomerular endothelial and podocyte cell damages, and KIM-1, a biomarker from apical membrane of the proximal renal tubule cell damage. These biomarkers are undetectable in urine from a normal kidney but detectable as response to ischemic or toxic insults, including diabetes.

```
Sequence overview
                                             SEQ ID NO: 1
AQFHRHKQLIRFLKRA
                                             SEQ ID NO: 2
Ac-AQFHRHKQLIRFLKRA
(IL-4 peptide including signal
peptide, 153 amino acids)
                                             SEQ ID NO: 3
MGLTSQLLPP LFFLLACAGN FVHGHKCDIT LQEIIKTLNS

LTEQKTLCTE LTVTDIFAAS KNTTEKETFC RAATVLRQFY

SHHEKDTRCL GATAQQFHRH KQLIRFLKRL DRNLWGLAGL

NSCPVKEANQ STLENFLERL KTIMREKYSK CSS (IL-4 peptide without signal peptide,
129 amino acids)
                                             SEQ ID NO: 4
HKCDIT LQEIIKTLNS LTEQKTLCTE LTVTDIFAAS

KNTTEKETFC RAATVLRQFY SHHEKDTRCL GATAQQFHRH

KQLIRFLKRL DRNLWGLAGL NSCPVKEANQ STLENFLERL

KTIMREKYSK CSS
```

Items

1. A method of treating diabetic nephropathy, said method comprising administering a therapeutic effective amount of a medicament comprising a peptide or a pharmaceutically acceptable salt thereof, wherein the peptide comprises a fragment consisting of 13 to 19 contiguous amino acid residues derived from the amino acid region $AA_{68}$-$AA_{97}$ of interleukin-4 (SEQ ID NO:4), preferably $AA_{68}$-$AA_{89}$ of interleukin-4 (SEQ ID NO:4), most preferably $AA_{71}$-$AA_{86}$ of interleukin-4 (SEQ ID NO:4) or a variant thereof having one, two, three, or four amino acid substitutions.

2. A method according to item 1, wherein said peptide comprises a fragment consisting of 14 to 18 contiguous amino acid residues derived from the amino acid region $AA_{68}$-$AA_{97}$ of interleukin-4 (SEQ ID NO:4), preferably $AA_{68}$-$AA_{89}$ of interleukin-4 (SEQ ID NO:4), most preferably $AA_{71}$-$AA_{86}$ of interleukin-4 (SEQ ID NO: 4) or a variant thereof having one, two, three or four amino acid substitutions.

3. A method according to any of the preceding items, wherein said peptide comprises a fragment consisting of 15 to 17 contiguous amino acid residues derived from the amino acid region $AA_{68}$-$AA_{97}$ of interleukin-4 (SEQ ID NO:4), preferably $AA_{68}$-$AA_{89}$ of interleukin-4 (SEQ ID NO:4), most preferably $AA_{71}$-$AA_{86}$ of interleukin-4 (SEQ ID NO:4) or a variant thereof having one, two, three, or four amino acid substitutions.

4. A method according to any of the preceding items, wherein said peptide comprises a fragment consisting 16 contiguous amino acid residues derived from the amino acid region $AA_{68}$-$AA_{97}$ of interleukin-4 (SEQ ID NO:4), preferably $AA_{68}$-$AA_{89}$ of interleukin-4 (SEQ ID NO:4), most preferably $AA_{71}$-$AA_{86}$ of interleukin-4 (SEQ ID NO:4) or a variant thereof having one, two, three, or four amino acid substitutions.

5. A method according to any of the preceding items, wherein said peptide comprises a fragment consisting of 16 contiguous amino acid residues derived from the amino acid region $AA_{71}$-$AA_{86}$ of interleukin-4 (SEQ ID NO:4) or a variant thereof having one, two, three, or four amino acid substitutions.

6. A method according to any of the preceding items, wherein said peptide comprises a fragment consisting of 16 amino acid residues having the structure AQFHRHKQLIRFLKRA (SEQ ID NO:1), or a variant thereof having one or two substitutions.

7. A method according to any of the preceding items, wherein said peptide comprises two or more peptide fragments covalently linked through a linker.

8. A method according to any of the preceding items, wherein said peptide comprises two or more peptide fragments covalently linked through a linker, and wherein each peptide fragment comprises or consists of the amino acid sequence AQFHRHKQLIRFLKRA (SEQ ID NO:1), or a variant thereof having one or two substitutions.

9. A method according to items 7 or 8, wherein said two or more peptide fragments are covalently linked via their C-terminal or N-terminal, preferably via their C-terminal.

10. A method according to any of the preceding items, wherein said peptide has the structure of Formula (I), or is a variant thereof having one or two substitutions in each peptide fragment:

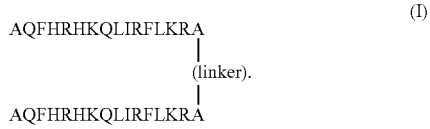

(I)

11. A method according to any of the preceding items, wherein said peptide has the structure of Formula (II), or is a variant thereof having one or two substitutions in each peptide fragment:

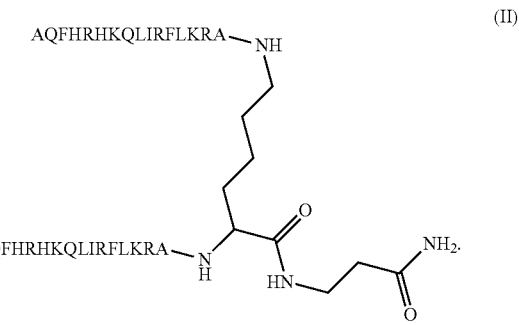

(II)

12. A method according to any of the preceding items, wherein said peptide is N-terminally acylated.

13. A method according to any of the preceding items, wherein said peptide is an agonist on type I IL-4R and an antagonist on type II IL-4R.

14. A peptide or a pharmaceutically acceptable salt thereof for use in the treatment of diabetic nephropathy, wherein the peptide comprises a fragment consisting of 13 to 19 contiguous amino acid residues derived from the amino acid region $AA_{68}$-$AA_{97}$ of interleukin-4 (SEQ ID NO:4), preferably $AA_{68}$-$AA_{89}$ of interleukin-4 (SEQ ID NO:4), most preferably $AA_{71}$-$AA_{86}$ of interleukin-4 (SEQ ID NO:4) or a variant thereof having one, two, three, or four amino acid substitutions.

15. A peptide for use according to item 14, wherein said peptide comprises a fragment consisting of 14 to 18 contiguous amino acid residues derived from the amino acid region $AA_{68}$-$AA_{97}$ of interleukin-4 (SEQ ID NO:4), preferably $AA_{68}$-$AA_{89}$ of interleukin-4 (SEQ ID NO:4), most preferably $AA_{71}$-$AA_{86}$ of interleukin-4 (SEQ ID NO: 4) or a variant thereof having one, two, three or four amino acid substitutions.

16. A peptide for use according to any of the preceding items 14-15, wherein said peptide comprises a fragment consisting of 15 to 17 contiguous amino acid residues derived from the amino acid region $AA_{68}$-$AA_{97}$ of interleukin-4 (SEQ ID NO: 4), preferably $AA_{68}$-$AA_{89}$ of interleukin-4 (SEQ ID NO:4), most preferably $AA_{71}$-$AA_{86}$ of interleukin-4 (SEQ ID NO:4) or a variant thereof having one, two, three, or four amino acid substitutions.

17. A peptide for use according to any of the preceding items 14-16, wherein said peptide comprises a fragment consisting of 16 contiguous amino acid residues derived from the amino acid region $AA_{68}$-$AA_{97}$ of interleukin-4 (SEQ ID NO:4), preferably $AA_{68}$-$AA_{89}$ of interleukin-4 (SEQ ID NO:4), most preferably $AA_{71}$-$AA_{86}$ of interleukin-4 (SEQ ID NO:4) or a variant thereof having one, two, three, or four amino acid substitutions.

18. A peptide for use according to any of the preceding items 14-17, wherein said peptide comprises a fragment consisting of 16 contiguous amino acid residues derived from the amino acid region $AA_{71}$-$AA_{86}$ of interleukin-4 (SEQ ID NO:4) or a variant thereof having one, two, three, or four amino acid substitutions.

19. A peptide for use according to any of the preceding items 14-18, wherein said peptide comprises a fragment consisting of 16 amino acid residues having the structure AQFHRHKQLIRFLKRA (SEQ ID NO:1), or a variant thereof having one or two substitutions.

20. A peptide for use according to any of the preceding items 14-19, wherein said peptide comprises two or more peptide fragments covalently linked through a linker.

21. A peptide for use according to any of the preceding items 14-20, wherein said peptide comprises two or more peptide fragments covalently linked through a linker, and wherein each peptide fragment comprises or consists of the amino acid sequence AQFHRHKQLIRFLKRA (SEQ ID NO:1), or a variant thereof having one or two substitutions.

22. A peptide for use according to any of the items 20-21, wherein said two or more peptide fragments are covalently linked via their C-terminal or N-terminal, preferably via their C-terminal.

23. A peptide for use according to any of the preceding items, wherein said peptide has the structure of Formula (I):

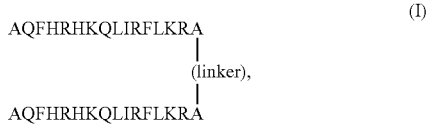

(I)

or is a variant thereof having one or two substitutions in each peptide fragment.

24. A peptide for use according to any of the preceding items, wherein said peptide has the structure of Formula (II):

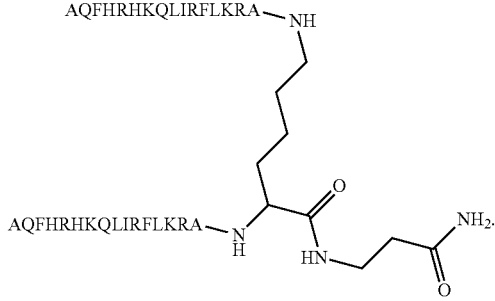

(II)

25. A peptide for use according to any of the preceding items, wherein said peptide is N-terminally acylated.

26. A peptide for use according to any of the preceding items, wherein said peptide is a partial agonist on type I IL-4R and an antagonist on type II IL-4R.

27. A pharmaceutical composition for use in the treatment of diabetic nephropathy, wherein said pharmaceutical composition comprises a peptide according to any of the preceding items.

REFERENCES

Klementiev B. et al.: *Antiinflammatory properties of a peptide derived from interleukin-4*. Cytokine, Vol. 64, No. 1, 10.2013, p. 112-21.

Frederikke E Sembach, Mette V Østergaard, Niels Vrang, Bo Feldt-Rasmussen, Keld Fosgerau, Jacob Jelsing, Lisbeth N Fink: *Rodent models of diabetic kidney disease: human translatability and preclinical validity*. Review Drug Discov Today. 2021 January; 26 (1): 200-217.

James P. Tam: *Synthetic peptide vaccine design: Synthesis and properties of a high-density multiple antigenic peptide system*. Proc. Natl. Acad. Sci. USA, Vol 85, pp. 5409-5413, August 1988.

---

The invention claimed is:

1. A method for the treatment of diabetic nephropathy, said method comprising administering a therapeutically effective amount of a peptide or a pharmaceutically acceptable salt thereof, wherein the peptide is a dimer comprising two fragments, each fragment consisting of the amino acid sequence AQFHRHKQLIRFLKRA (SEQ ID NO:1), wherein each fragment is covalently connected at its C-terminal through a linker, and wherein said peptide has the structure of Formula (II):

(II)

(SEQ ID NO: 1)
AQFHRHKQLIRFLKRA—NH (SEQ ID NO: 1)
AQFHRHKQLIRFLKRA—NH—CH(C(=O)—NH—CH2CH2—C(=O)NH2)—(CH2)4—NH (linker structure connecting to upper NH).

* * * * *

SEQUENCE LISTING

```
Sequence total quantity: 12
SEQ ID NO: 1            moltype = AA  length = 16
FEATURE                 Location/Qualifiers
source                  1..16
                        mol_type = protein
                        organism = synthetic construct
SEQUENCE: 1
AQFHRHKQLI RFLKRA                                                   16

SEQ ID NO: 2            moltype = AA  length = 16
FEATURE                 Location/Qualifiers
source                  1..16
                        mol_type = protein
                        organism = synthetic construct
SITE                    1
                        note = X = Ac-A (Acetyl alanine)
SEQUENCE: 2
XQFHRHKQLI RFLKRA                                                   16

SEQ ID NO: 3            moltype = AA  length = 153
FEATURE                 Location/Qualifiers
source                  1..153
                        mol_type = protein
                        organism = Homo sapiens
SEQUENCE: 3
MGLTSQLLPP LFFLLACAGN FVHGHKCDIT LQEIIKTLNS LTEQKTLCTE LTVTDIFAAS    60
KNTTEKETFC RAATVLRQFY SHHEKDTRCL GATAQQFHRH KQLIRFLKRL DRNLWGLAGL   120
NSCPVKEANQ STLENFLERL KTIMREKYSK CSS                                153

SEQ ID NO: 4            moltype = AA  length = 129
FEATURE                 Location/Qualifiers
```

-continued

```
source                      1..129
                            mol_type = protein
                            organism = Homo sapiens
SEQUENCE: 4
HKCDITLQEI IKTLNSLTEQ KTLCTELTVT DIFAASKNTT EKETFCRAAT VLRQFYSHHE    60
KDTRCLGATA QQFHRHKQLI RFLKRLDRNL WGLAGLNSCP VKEANQSTLE NFLERLKTIM   120
REKYSKCSS                                                          129

SEQ ID NO: 5                moltype = AA  length = 16
FEATURE                     Location/Qualifiers
source                      1..16
                            mol_type = protein
                            organism = synthetic construct
SEQUENCE: 5
ATAQQFHRHK QLIRFL                                                   16

SEQ ID NO: 6                moltype = AA  length = 16
FEATURE                     Location/Qualifiers
source                      1..16
                            mol_type = protein
                            organism = synthetic construct
SEQUENCE: 6
TAQQFHRHKQ LIRFLK                                                   16

SEQ ID NO: 7                moltype = AA  length = 16
FEATURE                     Location/Qualifiers
source                      1..16
                            mol_type = protein
                            organism = synthetic construct
SEQUENCE: 7
AQQFHRHKQL IRFLKR                                                   16

SEQ ID NO: 8                moltype = AA  length = 16
FEATURE                     Location/Qualifiers
source                      1..16
                            mol_type = protein
                            organism = synthetic construct
SEQUENCE: 8
QQFHRHKQLI RFLKRL                                                   16

SEQ ID NO: 9                moltype = AA  length = 16
FEATURE                     Location/Qualifiers
source                      1..16
                            mol_type = protein
                            organism = synthetic construct
SEQUENCE: 9
QFHRHKQLIR FLKRLD                                                   16

SEQ ID NO: 10               moltype = AA  length = 16
FEATURE                     Location/Qualifiers
source                      1..16
                            mol_type = protein
                            organism = synthetic construct
SEQUENCE: 10
FHRHKQLIRF LKRLDR                                                   16

SEQ ID NO: 11               moltype = AA  length = 16
FEATURE                     Location/Qualifiers
source                      1..16
                            mol_type = protein
                            organism = synthetic construct
SEQUENCE: 11
HRHKQLIRFL KRLDRN                                                   16

SEQ ID NO: 12               moltype = AA  length = 16
FEATURE                     Location/Qualifiers
source                      1..16
                            mol_type = protein
                            organism = synthetic construct
SEQUENCE: 12
RHKQLIRFLK RLDRNL                                                   16
```